US012485397B2

(12) United States Patent
Zhao et al.

(10) Patent No.: US 12,485,397 B2
(45) Date of Patent: Dec. 2, 2025

(54) FLUIDIZED BED REACTOR, HEAT REMOVAL WATER PIPE AND APPLICATION THEREOF IN ACRYLONITRILE PRODUCTION

(71) Applicants: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

(72) Inventors: Le Zhao, Shanghai (CN); Lianghua Wu, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 867 days.

(21) Appl. No.: 17/756,302

(22) PCT Filed: Nov. 18, 2020

(86) PCT No.: PCT/CN2020/129820
§ 371 (c)(1),
(2) Date: May 20, 2022

(87) PCT Pub. No.: WO2021/098729
PCT Pub. Date: May 27, 2021

(65) Prior Publication Data
US 2022/0410107 A1    Dec. 29, 2022

(30) Foreign Application Priority Data
Nov. 20, 2019 (CN) .......................... 201911152105.8

(51) Int. Cl.
*B01J 8/18*    (2006.01)
*B01J 8/00*    (2006.01)
*B01J 8/24*    (2006.01)

(52) U.S. Cl.
CPC ........... *B01J 8/1872* (2013.01); *B01J 8/0055* (2013.01); *B01J 8/1836* (2013.01); *B01J 8/24* (2013.01)

(58) Field of Classification Search
CPC ...... B01J 8/1872; B01J 8/0055; B01J 8/1836; B01J 8/24; B01J 2208/00132;
(Continued)

(56) References Cited

FOREIGN PATENT DOCUMENTS

| CN | 104624401 A | 5/2015 |
|---|---|---|
| CN | 104941529 A | 9/2015 |

(Continued)

OTHER PUBLICATIONS

Gutman A.V.; The Eurasian Patent Office, Office action for Application No. 202291213; Gorodissky Intellectual Property TMT; Jul. 7, 2023; pp. 1-3.

*Primary Examiner* — Huy Tram Nguyen
(74) *Attorney, Agent, or Firm* — NKL LAW; Allen Xue

(57) ABSTRACT

Disclosed is a fluidized bed reactor and a heat removal water pipe and application thereof in acrylonitrile production. The fluidized bed reactor comprises at least a reaction cooling section and a vertical inner component provided in the reaction cooling section. Where, at a cross section transverse and perpendicular to a central axis of the fluidized bed reactor, an area of the cross section of the reaction cooling section is designated as S1 (expressed in a unit of m²) and an outer contour circumference of the cross section of the vertical inner component is designated as L1 (expressed in a unit of m), L1/S1=2.0-4.3 m$^{-1}$. The fluidized bed reactor (Continued)

can promote the breaking of bubbles as early as possible and effectively limit the growth of the bubbles.

22 Claims, 7 Drawing Sheets

(58) Field of Classification Search
CPC ... C07C 253/26; C07C 253/18; C07C 255/08; C07D 301/04; C07D 303/04
USPC .......................................................... 422/139
See application file for complete search history.

(56) References Cited

FOREIGN PATENT DOCUMENTS

| | | |
|---|---|---|
| CN | 104941532 A | 9/2015 |
| CN | 105758245 A | 7/2016 |
| CN | 108940137 A | 12/2018 |
| JP | S5487675 A | 7/1979 |
| JP | S60102929 A | 6/1985 |
| JP | 2003192656 A | 7/2003 |
| JP | 2005077035 A | 3/2005 |
| JP | 2010247053 A | 11/2010 |
| JP | 2018192446 A | 12/2018 |
| JP | 2019105381 A | 6/2019 |
| KR | 20090099209 A | 9/2009 |
| WO | 2016144662 A1 | 9/2016 |
| WO | 2019197907 A2 | 10/2019 |

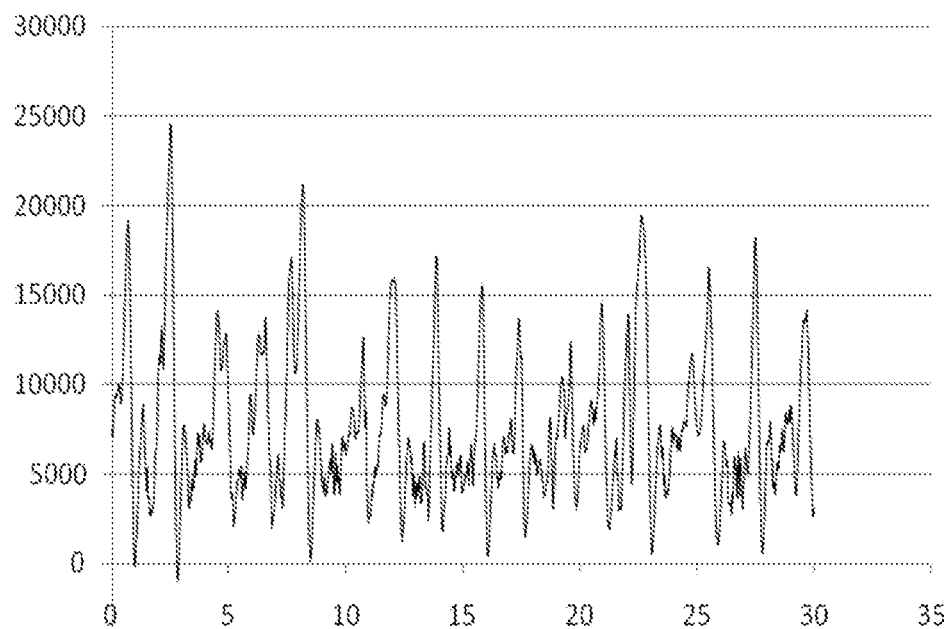
FIG. 6 (Comparative Example 1)
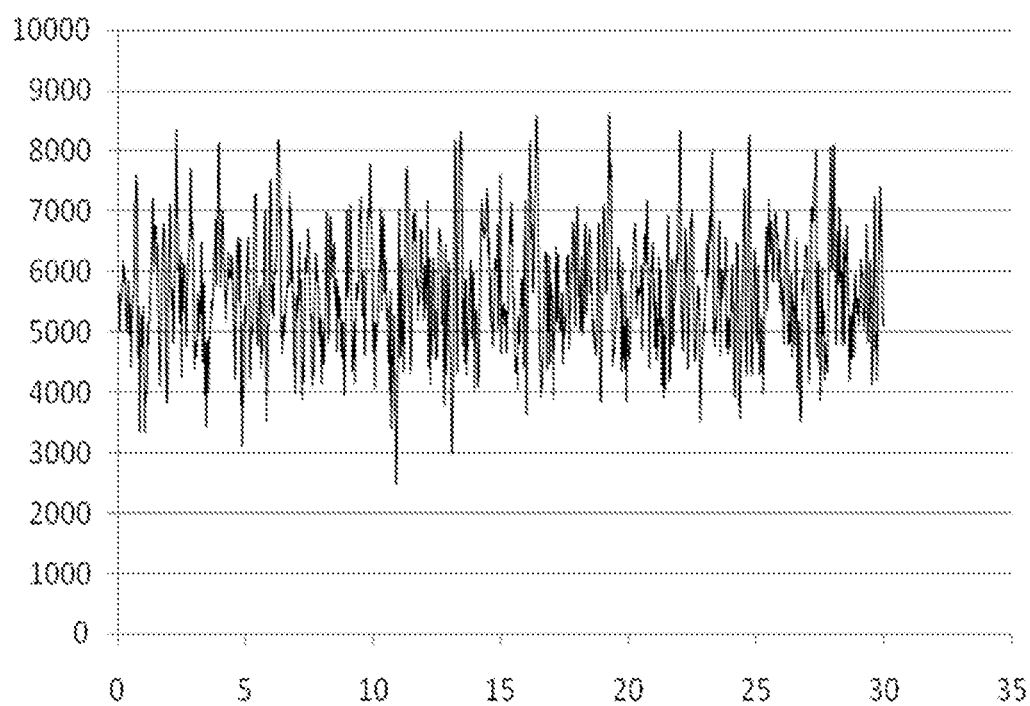
FIG. 7 (Comparative Example 2)

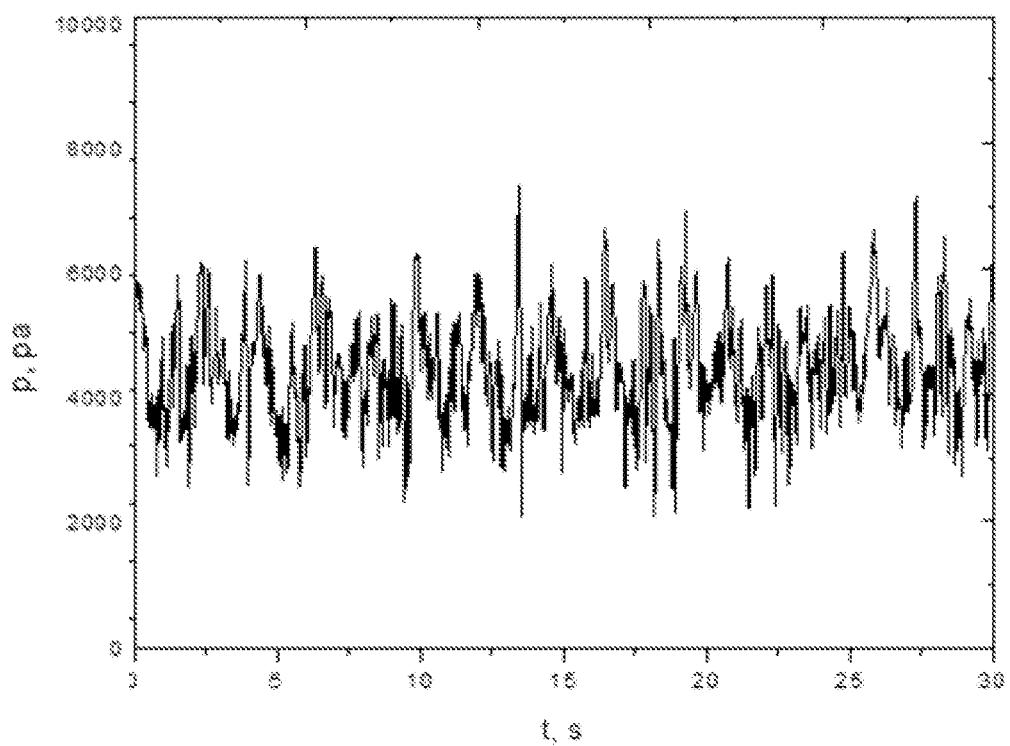
FIG. 8 (Example 1)
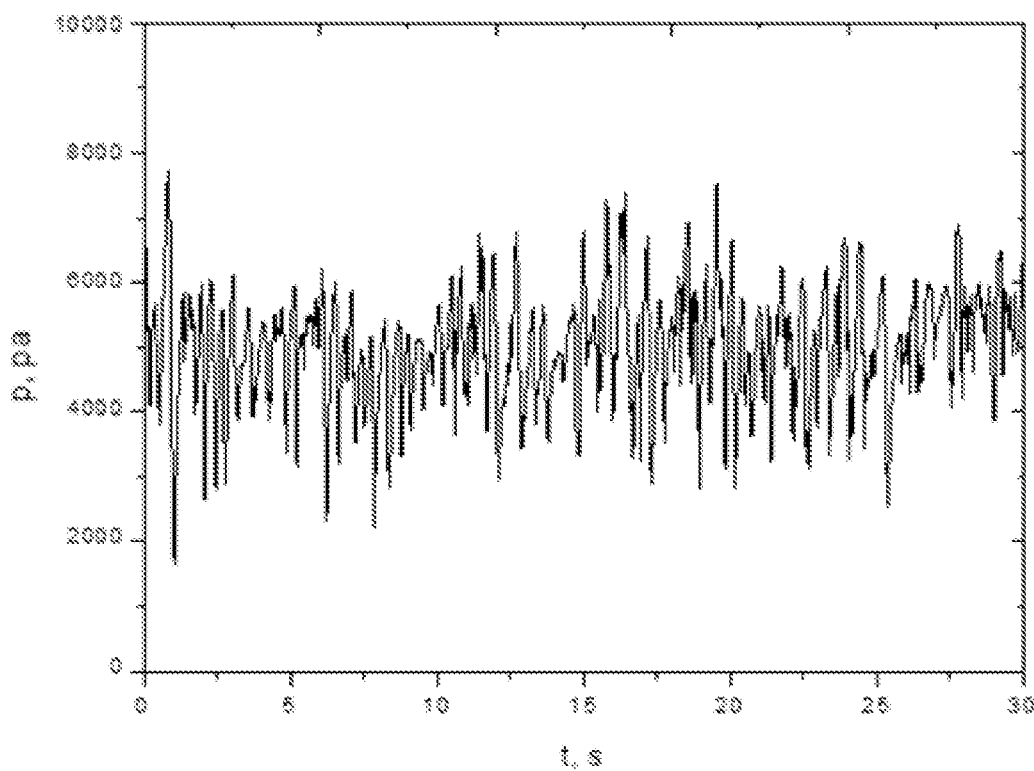
FIG. 9 (Example 2)

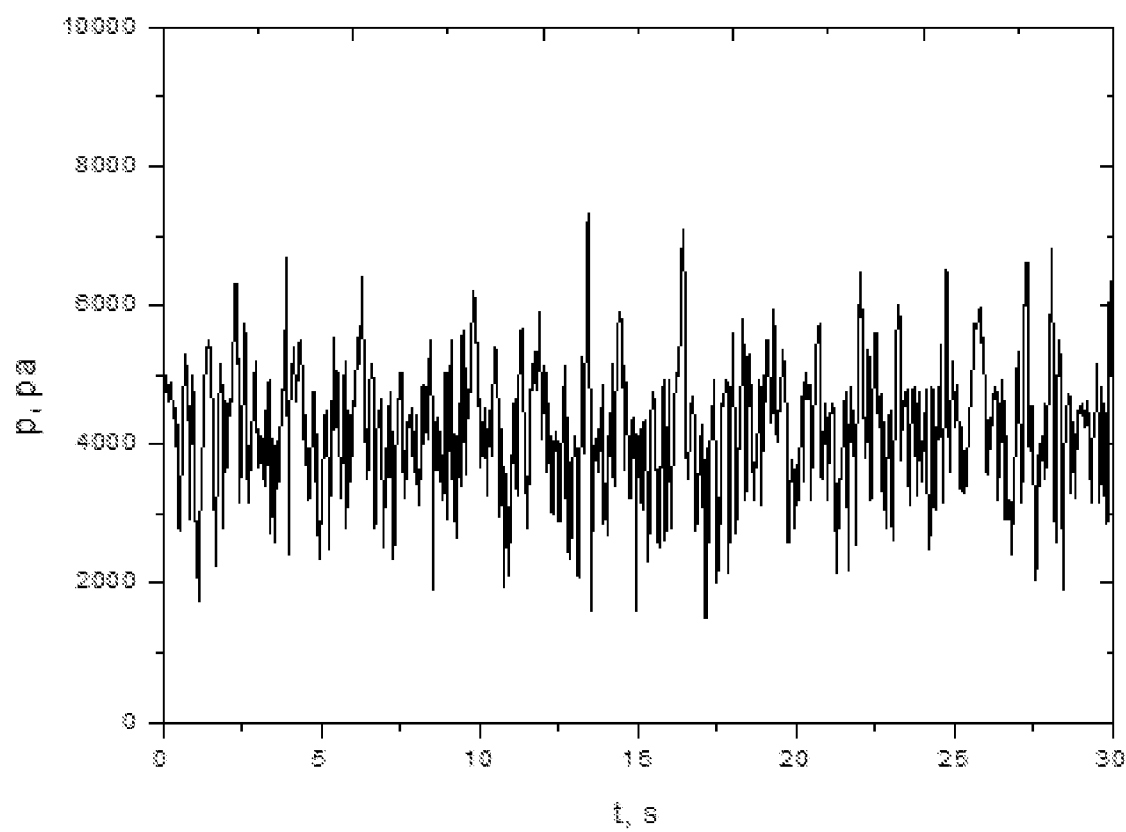
FIG. 10 (Example 3)

FLUIDIZED BED REACTOR, HEAT REMOVAL WATER PIPE AND APPLICATION THEREOF IN ACRYLONITRILE PRODUCTION

TECHNICAL FIELD

The present invention relates to a fluidized bed reactor and a heat removal water pipe particularly suitable for being arranged in the fluidized bed reactor. The present invention further relates to the use of the fluidized bed reactor and the heat removal water pipe in the production of acrylonitrile.

BACKGROUND ART

Acrylonitrile is an important chemical raw material in petrochemical industry. The one-step method for producing acrylonitrile by propylene ammoxidation is commonly used all over the world, in which, under the action of a fluidized bed ammoxidation catalyst and under a certain reaction temperature and pressure, the propylene is subjected to ammoxidation to generate acrylonitrile, along with byproducts such as acetonitrile, hydrocyanic acid and the like, as well as $CO$, $CO_2$ deep oxidation products. The reaction is strongly exothermic and is accompanied by a large amount of heat generation.

Typical acrylonitrile fluidized bed reactor internals include a propylene-ammonia distributor, an air distribution plate, a heat removal water pipe (also known as a cooling coil) and a cyclone separator, wherein the heat removal water pipe and the dipleg of the cyclone separator are disposed in the catalyst bed as vertical components of the fluidized bed. The heat removal water pipe can remove a large amount of heat generated during the reaction out of the reaction system in time and maintain the reaction temperature in a stable state, and the cyclone separator can capture the catalyst carried by the gas moving upwards and return the catalyst to the catalyst bed through the dipleg so as to reduce the loss of the catalyst.

Conventional vertical components of a fluidized bed reactor are shown in FIGS. 1 and 2. FIG. 1 is an axial view of the vertical components, and FIG. 2 is a view of the cross-sectional arrangement of the vertical components. The vertical components comprise heat removal water pipes and diplegs of cyclone separators. The heat removal water pipes comprise a cooling water pipe and a superheated water pipe, and high-pressure steam generated by the superheated water pipe is usually used in turbines of air compressor and refrigerator. Alternatively, the heat removal water pipe may be provided with only the cooling water pipe, depending on the actual conditions of the apparatus. Here, the heat removal water pipe typically has an inlet, a straight pipe section and an outlet, and two adjacent straight pipe sections are in fluid communication through a U-shaped pipe.

Chinese patent applications CN104941532A and CN104941529A disclose a cooling coil design for an ammoxidation reactor. The cooling coil may be more closely packed by providing individual lines defining a cooling coil in a transverse arrangement rather than a linear arrangement.

Chinese patent application CN104624401A discloses an improved configuration of cyclone separators. Each multi-stage set of cyclone separators comprises a first stage cyclone separator having a first stage inlet configured to receive a reactor stream flowing upwards from a fluidized catalyst bed in the reactor and to separate at least a portion of the catalyst from the reactor stream. The square meter ratio of the first stage inlet area per square meter of the available cross-sectional area of the reactor is from about 0.03 to about 0.05.

SUMMARY OF THE INVENTION

When the fluidized bed reactor is used in propylene ammoxidation reaction to produce acrylonitrile, the propylene ammoxidation reaction is a gas-solid heterogeneous catalytic reaction, the flowing condition of gas in the reactor is different from that of a free bubbling bed, and bubbles generated by the gas passing through the distribution plate will become larger along with the rise of the bed. The inventors of the present invention have found that the presence of vertical internals helps to break up the bubbles, and that small bubbles are more conducive to mass transfer than large bubbles, and thus beneficial in improving the production of useful products. The inventors of the present invention further found that the heat removal water pipes and cyclone separators, as vertical components, have the function of breaking bubbles in addition to their basic functions, and may also contribute to reducing the back mixing of gas and solid phases and reducing the generation of deep oxidation products. The distribution of these vertical components over the cross section of the reactor has a direct impact on whether an effective limitation to the growing of bubbles or an effective breakage of bubbles can be achieved, i.e. has a direct impact on the reaction results. The present invention has been completed based on this finding.

Specifically, the present invention relates to the following aspects:

1. A fluidized bed reactor, comprising at least a reaction cooling section and a vertical inner component provided in the reaction cooling section, wherein where a length of the reaction cooling section in a direction along a central axis of the fluidized bed reactor is designated as L (expressed in a unit of m), and, at a cross section transverse and perpendicular to the central axis of the fluidized bed reactor at an arbitrary position within the region of the entire length L of the reaction cooling section, preferably within the region from 49% L above to 49% L below a central point of the reaction cooling section (more preferably within the region from 45% L above to 38% L below the central point of the reaction cooling section, and further more preferably within the region from 40% L above to 8% L below the central point of the reaction cooling section), an area of the cross section of the reaction cooling section is designated as S1 (expressed in a unit of $m^2$), and an outer contour circumference of the cross section of the vertical inner component (where a plurality of cross sections are present, it refers to the sum of the outer contour circumferences of all cross sections) is designated as L1 (expressed in a unit of m), L1/S1=2.0-4.3 $m^{-1}$, preferably L1/S1=2.2-4.1 $m^{-1}$, more preferably L1/S1=2.4-3.9 $m^{-1}$.

2. The fluidized bed reactor according to any of the preceding or subsequent aspects, wherein the vertical inner component is a heat removal water pipe or a combination of a heat removal water pipe and a gas-solid separator (preferably a cyclone separator).

3. The fluidized bed reactor according to any of the preceding or subsequent aspects, wherein the vertical inner component is a heat removal water pipe, where, at a cross section transverse and perpendicular to the central axis of the fluidized bed reactor, an area of the cross section of the reaction cooling section is designated as S1 (expressed in a unit of $m^2$), and an outer contour circumference of the cross section of the heat removal water pipe (calculated on the basis of the straight pipe section) (where a plurality of cross sections are present, it refers to the sum of the outer contour circumferences of all cross sections) is designated as L2 (expressed in a unit of m), L2/S1=1.7-3.6 m$^{-1}$, preferably L2/S1=1.9-3.5 m$^{-1}$, more preferably L2/S1=2.1-3.3 m$^{-1}$, and the vertical inner component optionally further comprises a gas-solid separator (preferably a cyclone separator), where, at a cross section transverse and perpendicular to the central axis of the fluidized bed reactor, an area of the cross section of the reaction cooling section is designated as S1 (expressed in a unit of m$^2$), and an outer contour circumference of the cross section of the gas-solid separator (calculated on the basis of the dipleg) (where a plurality of cross sections are present, it refers to the sum of the outer contour circumferences of all cross sections) is designated as L3 (expressed in a unit of m), L3/S1=0.25-0.85 m$^{-1}$, preferably L3/S1=0.30-0.75 m$^{-1}$, and more preferably L3/S1=0.35-0.65 m$^{-1}$.

4. The fluidized bed reactor according to any of the preceding or subsequent aspects, wherein the number of the heat removal water pipes (calculated on the basis of the straight pipe section) is 220-5000, preferably 300-2400, and/or the number of the gas-solid separators (calculated on the basis of the dipleg) is 16-516, preferably 16-210, and/or, the ratio of the number of the straight pipe sections to the number of the diplegs is 8.5-24.0, preferably 10.0-23.0, more preferably 11.5-21.0.

5. The fluidized bed reactor according to any of the preceding or subsequent aspects, wherein the external diameters of the straight pipe sections, being the same as or different from each other, are each independently 80 to 180 mm, preferably 90 to 170 mm, and/or the inner diameters of the straight pipe sections, being the same as or different from each other, are each independently 60 to 150 mm, preferably 70 to 140 mm, and/or the lengths of the straight pipe sections, being the same as or different from each other, are each independently 4.0 to 13 m, preferably 5.5 to 12.0 m, and/or the external diameters of the diplegs, being the same as or different from each other, are each independently 150 to 410 mm, preferably 200 to 360 mm, and/or the inner diameters of the diplegs, being the same as or different from each other, are each independently 130 to 400 mm, preferably 180 to 350 mm, and/or the lengths of the diplegs, being the same as or different from each other, are each independently 6 to 14 m, preferably 10 to 13 m, and/or, the reaction cooling section has a diameter of 5 to 29 m, preferably 7 to 20 m, an area S1 of 19.6 to 660 m$^2$, preferably 38.5 to 314 m$^2$, and/or a length L of 4-12.5 m, preferably 5.5-11.5 m.

6. The fluidized bed reactor according to any of the preceding or subsequent aspects, comprising a head, a dilute phase zone, the reaction cooling section, a pre-reaction section and a cone in sequence from top to bottom, and further comprising a gas distribution plate and optionally a fluid distributor provided in the pre-reaction section.

7. The fluidized bed reactor according to any of the preceding or subsequent aspects, wherein the reaction cooling section has a substantially circular cross section, and/or the cross section of the vertical inner component has a substantially circular inner contour and a substantially circular outer contour, and/or the cross section of the vertical inner component has a substantially circular inner contour and a substantially circular outer contour with protrusion(s), and/or the vertical inner component comprises a heat removal water pipe, the heat removal water pipe has a heat removal medium inlet, n straight pipe (preferably straight circular pipe) sections and a heat removal medium outlet, wherein a head end of the first straight pipe section is in communication with the heat removal medium inlet, a tail end of the n-th straight pipe section is in communication with the heat removal medium outlet, a tail end of the i-th straight pipe section is in communication with a head end of the (i+1)-th straight pipe section through a U-shaped pipe, wherein n is an integer from 2 to 100 (preferably an integer from 2 to 20), i refers to an arbitrary integer between 1 and n−1, and there is protrusion(s) on the outer wall of a part or all (such as 1-100%, 5-80%, or 10-40%) of the straight pipe sections.

8. A heat removal water pipe, having a heat removal medium inlet, n straight pipe (preferably straight circular pipe) sections and a heat removal medium outlet, wherein a head end of the first straight pipe section is in communication with the heat removal medium inlet, a tail end of the n-th straight pipe section is in communication with the heat removal medium outlet, a tail end of the i-th straight pipe section is in communication with a head end of the (i+1)-th straight pipe section through a U-shaped pipe, n is an integer from 2 to 100 (preferably an integer from 2 to 20), i refers to an arbitrary integer between 1 and n−1, and there is protrusion(s) on the outer wall of a part or all (such as 1-100%, 5-80% or 10-40%) of the straight pipe sections.

9. The heat removal water pipe according to any of the preceding or subsequent aspects, wherein the external diameters of the straight pipe sections, being the same as or different from each other, are each independently 80-180 mm, preferably 90-170 mm, and/or the inner diameters of the straight pipe sections, being the same as or different from each other, are each independently 60-150 mm, preferably 70-140 mm, and/or the lengths of the straight pipe sections, being the same as or different from each other, are each independently 4.0-13.0 m, preferably 5.5-12.0 m, and/or the centerlines of any two adjacent straight pipe sections are parallel to each other and the distances between the centerlines of any two adjacent straight pipe sections are the same as or different from each other (preferably the same as each other), and are each independently 160-540 mm, preferably 180-430 mm.

10. The heat removal water pipe according to any of the preceding or subsequent aspects, wherein the protrusion(s) extends continuously or discontinuously in a direction along a centerline of the straight pipe section, and/or the protrusion(s) extends continuously or discontinuously around the centerline of the straight pipe section (such as in the form of a ring or a spiral).

11. The heat removal water pipe according to any of the preceding or subsequent aspects, wherein where the protrusion(s) extends continuously or discontinuously in a direction along a centerline of the straight pipe section, the extension length Lt of the protrusion(s) is not greater than the length Lz of the straight pipe section (preferably Lt/Lz is 0.05 to 0.95, more preferably 0.1 to 0.6), and/or, where the protrusion(s) extends continuously or discontinuously around the centerline of the straight pipe section in the form of a ring, the height Hh of the ring is not greater than the length Lz of the straight pipe section (preferably Hh/Lz is 0 to 0.5, more preferably 0.01 to 0.3), or, where the protrusion(s) extends continuously or discontinuously around the centerline of the straight pipe section in the form of a spiral, the height Ht of the spiral is not greater than the length Lz of the straight pipe section (preferably Ht/Lz is 0.1 to 0.95, more preferably 0.2 to 0.6), and/or the height of the protrusion(s) is 0.005 to 0.3 times (preferably 0.008 to 0.1 times) the external diameter of the straight pipe section, and/or the width of the protrusion(s) is 0.005 to 0.3 times (preferably 0.008 to 0.2 times) the external diameter of the straight pipe section.

12. The heat removal water pipe according to any of the preceding or subsequent aspects, wherein the protrusion(s) extends continuously or discontinuously around a centerline of the straight pipe section, and there is an angle between the centerline of the protrusion(s) and the centerline of the straight pipe section that is greater than 0° and not greater than 90° (preferably not less than 5° and not greater than 75°, more preferably not less than 10° and not greater than 60°).

13. A fluidized bed reactor, comprising a head, a dilute phase zone, a dense phase zone and a cone in sequence from top to bottom, wherein the dense phase zone is provided with at least one heat removal water pipe according to any of the preceding or subsequent aspects.

14. Use of a fluidized bed reactor according to any of the preceding or subsequent aspects in the production of an epoxy compound (such as propylene oxide) or an unsaturated nitrile (such as acrylonitrile) by an olefin (such as propylene) oxidation process or an ammoxidation process.

15. A method for producing an unsaturated nitrile, comprising the step of subjecting an olefin (such as propylene) to an ammoxidation reaction in a fluidized bed reactor according to any of the preceding or subsequent aspects to produce an unsaturated nitrile (such as acrylonitrile).

BRIEF DESCRIPTION OF THE DRAWINGS

FIG. 6 shows a pressure pulsation intensity graph of Comparative Example 1.

FIG. 7 shows a pressure pulsation intensity graph of Comparative Example 2.

FIG. 8 shows a pressure pulsation intensity graph of Example 1.

FIG. 9 shows a pressure pulsation intensity graph of Example 2.

FIG. 10 shows a pressure pulsation intensity graph of Example 3.

DESCRIPTION OF THE REFERENCE NUMERALS

Figure 1:
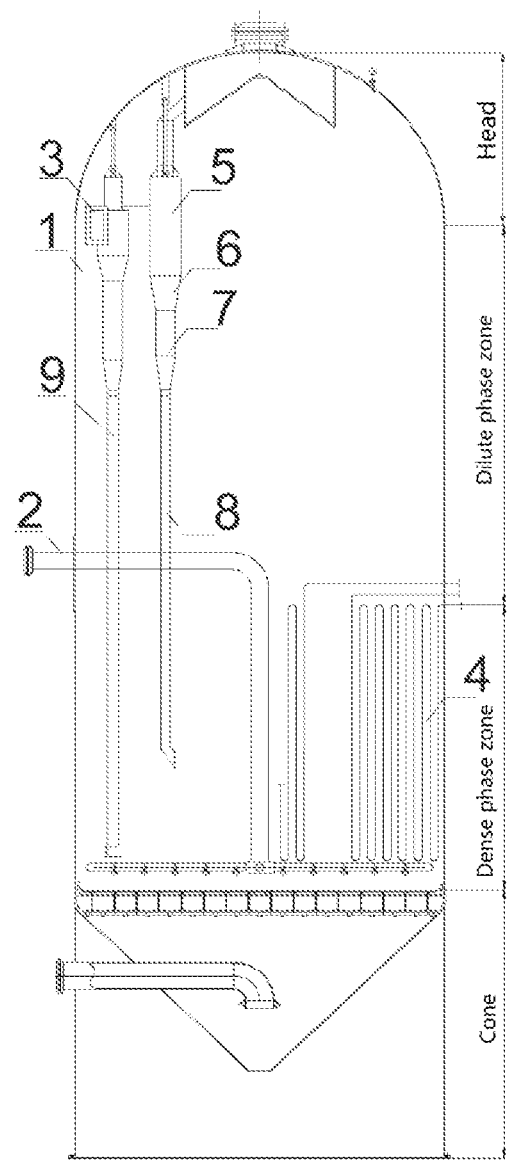
FIG. 1 is a schematic front view of a prior art fluidized bed reactor.
Figure 2:
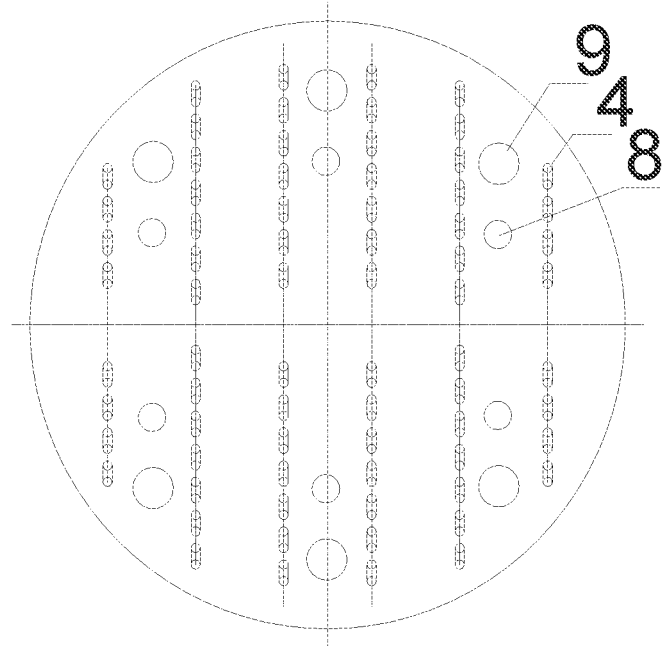
FIG. 2 is a schematic cross-sectional view of the reaction cooling section of a prior art fluidized bed.

1: fluidized bed reactor
2: feed line for mixed feed gas
3: inlet of cyclone separator
4: heat removal water pipe
5: cylinder of cyclone separator
6: cone of cyclone separator
7: ash bucket of cyclone separator
8: second-stage (third-stage) dipleg of cyclone separator
9: first-stage dipleg of cyclone separator Technical Effects By using the fluidized bed reactor of the present invention, the change of the flow pattern in the fluidized bed can be promoted as early as possible, and the breaking of bubbles can be promoted.

By using the fluidized bed reactor of the present invention, the growth of bubbles can be effectively limited, so that the conversion rate of feed gas can be improved and the yield of a target reaction product can be increased.

By using the fluidized bed reactor of the present invention, the back mixing of a gas phase and a solid phase and the generation of deep oxidation products can be reduced.

By using the fluidized bed reactor of the present invention, the heat and mass transfer efficiency can be improved, and the operation period of the device can be prolonged.

DETAILED DESCRIPTION OF THE INVENTION

The present application will be illustrated in detail hereinbelow with reference to embodiments thereof, but it should be noted that the scope of the present application is not limited by those embodiments, but is defined by the appended claims.

All publications, patent applications, patents, and other references cited herein are incorporated by reference in their entirety. Unless defined otherwise, all technical and scientific terms used herein have the same meaning as commonly understood by those skilled in the art. In case of conflict, the contents described herein, including definitions, should prevail.

When a material, method, component, apparatus, or device described herein is modified by an expression "known to those skilled in the art", "commonly known in the art" or the like, it is to be understood that said material, method, component, apparatus, or device covers not only those conventionally used in the art at the time of filing the present application, but also those not commonly used at present but will become commonly known in the art to be suitable for a similar purpose.

In the context of the present application, the term "substantially" means that a deviation acceptable or considered reasonable to those skilled in the art, such as within ±10%, within ±5%, within ±1%, within ±0.5% or within ±0.1%, is allowable to be present.

In the context of the present application, unless specifically stated otherwise, all percentages, parts, ratios, etc. are expressed by weight and all pressures given are gauge pressures.

In the context of the present application, any two or more embodiments of the present application may be arbitrarily combined, and the resulting technical solution forms a part of the initial disclosure of the present application and falls within the scope of the present application.

According to an embodiment of the present invention, it relates to a fluidized bed reactor, particularly a fluidized bed reactor for the production of acrylonitrile. Here, the fluidized bed reactor comprises at least a reaction cooling section and a vertical inner component disposed in the reaction cooling section.

Figure 3:
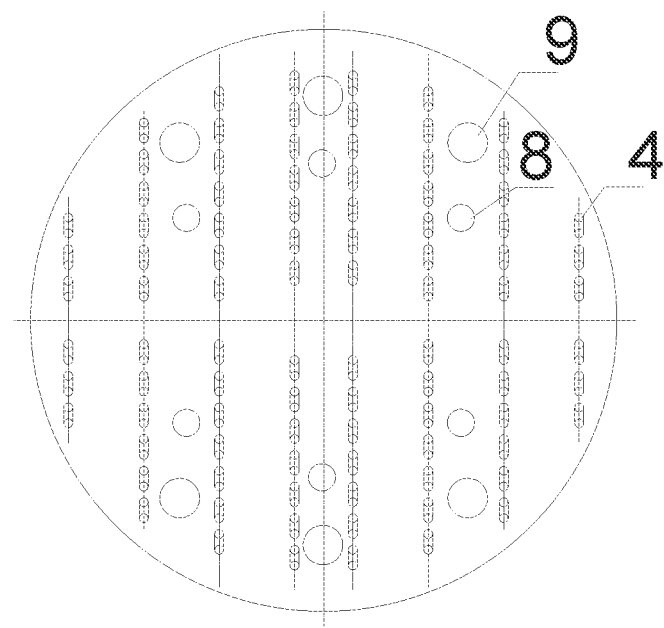
FIG. 3 is a schematic cross-sectional view of the reaction cooling section of a fluidized bed of the present invention.

According to an embodiment of the present invention, where a length of the reaction cooling section in a direction along a central axis of the fluidized bed reactor is designated as L (expressed in a unit of m), a cross section of the reaction cooling section and a cross section of the vertical inner component can be obtained at a cross-section plane transverse and perpendicular to the central axis of the fluidized bed reactor at an arbitrary position within the region of the entire length L of the reaction cooling section. Also, where there are a plurality of vertical inner components, cross sections of the plurality of vertical inner components can be obtained. These cross sections have an outer contour with an area and a circumference (referred to as the outer contour circumference), such as the circles represented by 4, 8 and 9 in FIG. 3. Here, where the area of the cross section of the reaction cooling section is designated as S1 (expressed in a unit of $m^2$), and the outer contour circumference of the cross section of the vertical inner component (where a plurality of cross sections are present, it refers to the sum of the outer contour circumferences of all cross sections) is designated as L1 (expressed in a unit of m), L1/S1=2.0-4.3 $m^{-1}$. Here, it is preferable within the region from 49% L above to 49% L below the center point of the reaction cooling section, more preferable within the region from 45% L above to 38% L below the center point of the reaction cooling section, and further more preferable with the region from 40% L above to 8% L below the center point of the reaction cooling section, that L1/S1=2.0-4.3 $m^{-1}$. Preferably, L1/S1=2.2-4.1 $m^{-1}$, more preferably L1/S1=2.4-3.9 $m^{-1}$. Where the L1/S1 is less than 2.0 $m^{-1}$, an unstable operation of the apparatus may be caused, and where the L1/S1 is greater than 4.3 $m^{-1}$, too much service space in the reactor may be occupied. According to an embodiment of the present invention, specific examples of the vertical inner component include a heat removal water pipe and a gas-solid separator, and particularly, a combination of the heat removal water pipe and the gas-solid separator.

According to an embodiment of the present invention, the cross-sectional area S1 of the reaction cooling section is typically 19.6 to 660 $m^2$, preferably 38.5 to 314 $m^2$.

According to an embodiment of the present invention, where the outer contour is substantially circular in shape, the outer contour circumference=3.14×D, wherein D refers to the diameter (expressed in a unit of m) of the outer contour, corresponding to the external diameter (expressed in a unit of m) of the relevant vertical inner component (e.g. a straight pipe section of the heat removal tube or a dipleg of the cyclone separator).

According to an embodiment of the present invention, the length L of the reaction cooling section in the direction of the central axis of the fluidized bed reactor is typically 4 to 12.5 m, preferably 5.5 to 11.5 m.

According to an embodiment of the present invention, the heat removal water pipe comprises a cooling water pipe for taking the heat generated by the reaction away from the reaction system by using latent heat of the coolant in the pipe, and a superheated water pipe for taking the heat generated by the reaction away from the reaction system by using sensible heat of the coolant in the pipe. Here, the diameters of the cooling water pipe and the superheated water pipe may be the same or different, and may be that conventionally used in the art, with no particular limitation.

According to an embodiment of the present invention, the straight pipe section of the heat removal water pipe is substantially disposed in the dense phase zone of the fluidized bed reactor and are used for timely removing reaction heat out of the system and maintaining the stable operation of the system. For this purpose, in the context of the present specification, the term "reaction cooling section" refers to a region of the fluidized bed reactor where the heat removal water pipe is provided, more particularly the region in the fluidized bed reactor where the straight pipe section of the heat removal water pipe is disposed, further more particularly the region in the dense phase zone of the fluidized bed reactor where the straight pipe section of the heat removal water pipe is disposed.

According to an embodiment of the present invention, the heat removal water pipe has an inlet, a straight pipe section and an outlet, and two adjacent straight pipe sections are typically connected through a U-shaped pipe and are in fluid communication with each other. The heat removal water pipe may only comprise one straight pipe section, may only comprise one U-shaped pipe, and may also be formed by connecting a plurality of U-shaped pipes in series. The larger the number of U-shaped pipes, the larger the outer contour circumference L1. In addition, the heat removal water pipes are typically evenly distributed within the fluidized bed reactor. For a specific example, if the fluidized bed reactor is divided into four quadrants of ABCD, the outer contour circumference of the heat removal water pipes in each quadrant is substantially the same.

According to an embodiment of the present invention, as the gas-solid separator, a cyclone separator may be mentioned. Here, the cyclone separator has a gas inlet, a cone, an ash bucket, a dipleg, and a gas outlet, wherein the dipleg is disposed as a vertical component in the catalyst bed, i.e., the dense phase zone of the fluidized bed reactor, and other components are disposed in the dilute phase zone at the upper part of the fluidized bed reactor. Here, the cyclone separator may be a single-stage cyclone separator, or two or more cyclone separators connected in series, with one cyclone separator comprising one corresponding dipleg. Typically, the dipleg of the first-stage cyclone separator extends to a certain position at the lower part of the catalyst bed (corresponding to the lower part of the dense phase zone) and the dipleg of the second-stage (third-stage) cyclone separator extends to a certain position at the lower part, middle part or upper part of the catalyst bed (corresponding to the lower part, middle part or upper part of the dense phase zone).

According to an embodiment of the present invention, the cyclone separator is typically arranged in a manner of two or more connected in series. During the operation of the fluidized bed reactor, a part of fine particle catalysts are carried away from the catalyst bed by the reaction gas, the catalysts carried by the gas enter the cyclone separator though the inlet of the first-stage cyclone separator, after passing through the first-stage cyclone separator, most part of the catalysts fall back into the catalyst bed along the dipleg of the first-stage cyclone separator, the remaining small part of the catalysts enter the second-stage cyclone separator along with the gas for further gas-solid separation, the separated catalysts are returned to the catalyst bed along the dipleg of the second-stage cyclone separator, the tail end of the dipleg of the second-stage cyclone separator is provided with a wing valve, the second-stage cyclone separator may be further connected with a third-stage cyclone separator in series to perform a further gas-solid separation, the separated catalysts are returned to the catalyst bed along the dipleg, and the gas flows upwards through a gas collection chamber and then leaves the reactor. Each cyclone separator has a dipleg for returning separated catalyst to the catalyst bed. A set of multi-stage cyclone separators has a plurality of diplegs.

According to an embodiment of the present invention, the vertical inner component is the heat removal water pipe, and where, at a cross section transverse and perpendicular to the central axis of the fluidized bed reactor, an area of the cross section of the reaction cooling section is designated as S1 (expressed in a unit of $m^2$) and an outer contour circumference of the cross section of the heat removal water pipe (calculated on the basis of the straight pipe section) (where a plurality of cross sections are present, it refers to the sum of the outer contour circumferences of all cross sections) is designated as L2 (expressed in a unit of m), L2/S1=1.7-3.6 $m^{-1}$, preferably L2/S1=1.9-3.5 $m^{-1}$, and more preferably L2/S1=2.1-3.3 m$^{-1}$. Where the ratio is less than 1.7 m$^{-1}$, a trouble in long-period stable operation of the reactor may be caused, for example, the heat transfer coefficient may be decreased due to the adhesion of molybdenum sheets to the wall of the heat removal water pipe, and the temperature control may be failed, and where the ratio is greater than 3.6 m$^{-1}$, it means that the number of the heat removal water pipes is increased, which may be advantageous for breaking bubbles, but will cause inconvenience to technicians during the maintenance of the apparatus.

According to an embodiment of the present invention, the number of the heat removal water pipes (calculated on the basis of the straight pipe section) in the fluidized bed reactor is typically 220-5000, preferably 300-2400.

According to an embodiment of the present invention, the external diameters of the straight pipe sections of the heat removal water pipe, being the same or different from each other, are each independently 80-180 mm, preferably 90-170 mm.

According to an embodiment of the present invention, the internal diameters of the straight pipe sections of the heat removal water pipe, being the same or different from each other, are each independently 60-150 mm, preferably 70-140 mm.

According to an embodiment of the present invention, the lengths of the straight pipe sections of the heat removal water pipe, being the same or different from each other, are each independently 4.0-13 m, preferably 5.5-12.0 m.

According to an embodiment of the present invention, the vertical inner component is the gas-solid separator, particularly the cyclone separator. For this purpose, where, at a cross section transverse and perpendicular to the central axis of the fluidized bed reactor, an area of the cross section of the reaction cooling section is designated as S1 (expressed in a unit of m$^2$), and an outer contour circumference of the cross section of the gas-solid separator (calculated on the basis of the dipleg) (where a plurality of cross sections are present, it refers to the sum of the outer contour circumferences of all cross sections) is designated as L3 (expressed in a unit of m), L3/S1=0.25-0.85 m$^{-1}$, preferably L3/S1=0.30-0.75 m$^{-1}$, and more preferably L3/S1=0.35-0.65 m$^{-1}$. Where the ratio is less than 0.25 m$^{-1}$, there may be a risk of insufficient catalyst separation or blocking of the dipleg. Instead, where the ratio is greater than 0.85 m$^{-1}$, on the one hand, the equipment cost will be increased, on the other hand, more effective space in the reactor will be occupied, and under the same reaction conditions, the linear velocity of the reaction operation will be increased, which may cause a further increase of the catalyst entrainment.

According to an embodiment of the present invention, the number of gas-solid separator (calculated on the basis of the dipleg) in the fluidized bed reactor is 16 to 516, preferably 16 to 210.

According to an embodiment of the present invention, in the fluidized bed reactor, the ratio of the number of the straight pipe sections to the number of the diplegs is 8.5 to 24.0, preferably 10.0 to 23.0, more preferably 11.5 to 21.0.

According to an embodiment of the present invention, the external diameters of the diplegs of the gas-solid separator, being the same or different from each other, are each independently 150-410 mm, preferably 200-360 mm.

According to an embodiment of the present invention, the inner diameters of the diplegs of the gas-solid separator, being the same or different from each other, are each independently 130-400 mm, preferably 180-350 mm.

According to an embodiment of the present invention, the lengths of the diplegs of the gas-solid separator, being the same or different from each other, are each independently 6 to 14 m, preferably 10 to 13 m.

According to an embodiment of the present invention, the fluidized bed reactor comprises a head, a dilute phase zone, the reaction cooling section, a pre-reaction section and a cone in sequence from top to bottom, and further comprises a gas distribution plate and optionally a fluid distributor provided in the pre-reaction section. Here, as the fluidized bed reactor, a fluidized bed reactor for the production of acrylonitrile may be preferably mentioned. In this case, said other distribution plate is an air distribution plate, and the fluid distributor is a propylene-ammonia distributor. For the structure and operation of the fluidized bed reactor, particularly the fluidized bed reactor for the production of acrylonitrile, etc., relevant technical information known in the art can be directly applied by those skilled in the art, of which the detailed description is omitted herein.

According to an embodiment of the present invention, the cross section of the reaction cooling section is substantially circular in shape. Further, the diameter of the reaction cooling section is typically 5 to 29 m, preferably 7 to 20 m, but it is not limited thereto in some cases.

According to an embodiment of the present invention, the inner and outer contours of the cross section of the vertical inner component are substantially circular in shape. For this purpose, the vertical inner component is substantially in the shape of a circular tube, particularly a straight circular tube.

According to an embodiment of the present invention, the vertical inner component has a substantially circular inner contour and a substantially circular outer contour with protrusion(s). For this purpose, the appearance of the vertical inner component is a substantially circular tube with protrusion(s), and the interior of the vertical inner component is a substantially circular tube shape. As a vertical inner component of such a structure, the heat removal water pipe of the present invention described hereinbelow may be particularly mentioned, which is characterized by having a protrusion on the outer wall of a part or all of the straight pipe section.

According to an embodiment of the present invention, the vertical inner component comprises a heat removal water pipe of the present invention described hereinafter. For a vertical inner component with such a specific structure, the outer contour of its cross section is no longer substantially circular in shape, but has a substantially circular shape with protrusion (s) (i.e. a profiled shape). For this reason, the outer contour circumference has to be calculated according to the practical situation of the profiled shape. Nevertheless, no matter what the profiled shape is, the person skilled in the art can use known mathematical geometry methods to calculate the circumference of the outer contour of said shape, of which the detailed description is omitted here.

According to an embodiment of the present invention, it is related to a heat removal water pipe, which has a heat removal medium inlet, n straight pipe sections and a heat removal medium outlet. Here, as the straight pipe, a straight circular tube may be preferably mentioned.

According to an embodiment of the present invention, in the heat removal water pipe, the head end of the first straight pipe section is in communication with the heat removing medium inlet, a tail end of the n-th straight pipe section is in communication with the heat removing medium outlet, a tail end of the i-th straight pipe section is in communication with a head end of the (i+1)-th straight pipe section through a U-shaped pipe, and a part or all of the outer walls of the straight pipe sections are provided with protrusions. Here, n is an integer of 2 to 100, preferably 2 to 20, and i refers to an arbitrary integer between 1 and n–1. Further, the term "a part or all" covers, for example, 1 to 100%, 5 to 80%, or 10 to 40% of the total amount, but is not limited thereto in some cases.

According to an embodiment of the present invention, the protrusion(s) is connected to the outer wall of the straight pipe section. Here, the way of connection is not particularly limited, and spot welding, continuous welding, integral molding, or other ways may be adopted.

According to an embodiment of the present invention, the external diameters of the straight pipe sections of the heat removal water pipe, being the same or different from each other, are each independently 80-180 mm, preferably 90-170 mm.

According to an embodiment of the present invention, the internal diameters of the straight pipe sections of the heat removal water pipe, being the same or different from each other, are each independently 60-150 mm, preferably 70-140 mm.

According to an embodiment of the present invention, the lengths of the straight pipe sections of the heat removal water pipe, being the same or different from each other, are each independently 4.0 to 13.0 m, preferably 5.5 to 12.0 m.

According to an embodiment of the present invention, in the heat removal water pipe, the central lines of any two adjacent straight pipe sections are parallel to each other and the distances between the central lines of any two adjacent straight pipe sections are the same or different (preferably the same as each other), and are each independently 160-540 mm, preferably 180-430 mm.

According to an embodiment of the present invention, in the heat removal water pipe, the protrusion(s) extends continuously or discontinuously along (parallel to) a direction of the centerline of the straight pipe section. Here, the number of the protrusion(s) may be 1 to 10, 1 to 4, 1 or 2.

According to an embodiment of the present invention, in the heat removal water pipe, the protrusion(s) extends continuously or discontinuously around the centerline of the straight pipe section, such as in the form of a ring or spiral. Here, the number of the protrusion(s) may be 1 to 20, 1 to 10, 1 to 4, 1 or 2.

According to an embodiment of the present invention, in the heat removal water pipe, where the protrusion(s) extends continuously or discontinuously in a direction along the centerline of the straight pipe section, the extension length Lt of the protrusion is not greater than the length Lz of the straight pipe section, preferably, Lt/Lz is 0.05-0.95, and more preferably, 0.1-0.6. Where a plurality of protrusions are present, different protrusions may be parallel to each other or at an angle to each other, preferably parallel to each other, more preferably uniformly arranged in the radial direction of said straight pipe section.

According to an embodiment of the present invention, in the heat removal water pipe, where the protrusion(s) extends continuously or discontinuously around the centerline of the straight pipe section in the form of a ring, the height Hh of the ring is not greater than the length Lz of the straight pipe section, preferably Hh/Lz is 0 to 0.9, more preferably 0.01 to 0.6. Here, the height Hh refers to the length of the corresponding section of the straight pipe section having the protrusion(s). Where a plurality of protrusion(s) are present, the vertical spacing l1 between different protrusions is not greater than the length Lz of the straight pipe section, preferably l1/Lz is 0.01-0.5, more preferably 0.03-0.4. Preferably, the angle α1 between the centerline of the protrusion(s) and the centerline of the straight pipe section is greater than 0° and not greater than 90°, preferably not less than 5° and not greater than 75°, more preferably not less than 10° and not greater than 60°.

According to an embodiment of the present invention, in the heat removal water pipe, where the protrusion(s) extends continuously or discontinuously around the centerline of the straight pipe section in the form of a spiral, the height Ht of the spiral is not greater than the length Lz of the straight pipe section, preferably Ht/Lz is 0.1-0.95, and more preferably 0.2-0.6. Here, the height Ht refers to the length of the corresponding section of the straight pipe section having the protrusion(s). In addition, the screw pitch l1 of the spiral is not greater than the length Lz of the straight pipe section, preferably l1/Lz is 0.01-0.5, more preferably 0.03-0.4. Preferably, the angle α1 between the centerline of the protrusion(s) and the centerline of the straight pipe section is greater than 0° and not greater than 90°, preferably not less than 5° and not greater than 75°, more preferably not less than 10° and not greater than 60°. Further, it is preferable that the angle α2 between the tangent line of the protrusion(s) along the straight pipe section and the centerline of the straight pipe section is not less than 0° and not greater than 90°, preferably not less than 5° and not greater than 75°, more preferably not less than 10° and not greater than 60°.

According to an embodiment of the present invention, in the heat removal water pipe, the height of the protrusion(s) is 0.005 to 0.3 times, preferably 0.008 to 0.1 times, the external diameter of the straight pipe section.

According to an embodiment of the present invention, in the heat removal water pipe, the width of the protrusion(s) is 0.005 to 0.3 times, preferably 0.008 to 0.2 times, the external diameter of the straight pipe section.

According to an embodiment of the present invention, it also relates to a fluidized bed reactor comprising a head, a dilute phase zone, a dense phase zone and a cone in sequence from top to bottom. Here, at least one heat removal water pipe according to any one of the preceding aspects of the present invention is provided in the dense phase zone. Preferably, the heat removal water pipes are uniformly distributed in the fluidized bed reactor. For a specific example, if the fluidized bed reactor is divided into four quadrants of ABCD, the outer contour circumference of the heat removal water pipes in each quadrant is substantially the same. Further, as the fluidized bed reactor, a fluidized bed reactor for the production of acrylonitrile may be preferably mentioned. For the structure and operation of the fluidized bed reactor, particularly the fluidized bed reactor for the production of acrylonitrile, etc., relevant technical information known in the art can be directly applied by those skilled in the art, of which the detailed description is omitted herein.

According to an embodiment of the present invention, in the fluidized-bed reactor, a heat removal water pipe having a structure conventionally known in the art may be provided in addition to the heat removal water pipe having the specific structure of the present invention. Preferably, the number of heat removal water pipes having the specific structure of the present invention is, for example, 1-100%, 5-80% or 10-40%, of the total number of all heat removal water pipes, calculated on the basis of the straight pipe section. Preferably, the heat removal water pipes are uniformly distributed in the fluidized bed reactor. For example, if the fluidized bed reactor is divided into four quadrants of ABCD, the outer contour circumference of the heat removal water pipes in each quadrant is substantially the same.

According to an embodiment of the present invention, it also relates to the use of the fluidized bed reactor according to any one of the above aspects of the present invention in the production of an epoxy compound or an unsaturated nitrile by an olefin oxidation process or an ammoxidation process. Here, as the olefin, propylene may be particularly mentioned; as the epoxide, propylene oxide may be particularly mentioned; and as the unsaturated nitrile, acrylonitrile may be particularly mentioned.

According to an embodiment of the present invention, it particularly relates to a method for producing acrylonitrile, comprising the step of subjecting propylene to ammoxidation reaction in a fluidized-bed reactor according to any one of the above aspects of the present invention to produce acrylonitrile.

According to an embodiment of the present invention, the olefin oxidation or ammoxidation process may be performed in any manner and by any method conventionally known in the art, and such information is known to those skilled in the art, of which the detailed description is omitted herein. However, specific examples of the conditions for the ammoxidation reaction include: a molar ratio of propylene to ammonia to air (calculated on the basis of molecular oxygen) of typically 1:1.1-1.3:1.8-2.0, a reaction temperature of typically 420-440° C., a reaction pressure (gauge pressure) of typically 0.03-0.14 MPa, and a weight hourly space velocity of typically 0.04-0.10 $h^{-1}$.

EXAMPLES

The present application will be described in further detail below with reference to examples and comparative examples, but the present application is not limited to the following examples.

In the following examples and comparative examples, the acrylonitrile yield and the propylene conversion can be calculated according to the following equations:

Yield of acrylonitrile: $AN\% = C_{AN}/\Sigma C * 100$

Conversion of propylene: $Cc_3\% = (1 - Cc_{3in}/Cc_{3out}) * 100$ wherein:

$C_{AN}$: molar amount (mol) of carbon contained in AN in the gas at the outlet of the reactor $\Sigma C$: total molar amount (mol) of carbon in the gas at the outlet of the reactor $Cc_{3out}$: molar amount (mol) of carbon contained in $C_3$ in the gas at the outlet of the reactor $Cc_{3in}$: molar amount (mol) of carbon contained in $C_3$ in the gas at the inlet of the reactor In the examples and comparative examples that follow, the fluidization condition of the fluidized bed can also be characterized by pressure pulsation intensity graph or data.

Comparative Example 1

As shown in FIG. 1, the fluidized bed reactor had a diameter of 1.5 m, a tangential height of 16 m (i.e., the total height of a dense phase zone and a dilute phase zone shown in the figure), was filled with 3.8 tons of acrylonitrile catalyst of SANC series available from Shanghai Research Institute of Petrochemical Technology SINOPEC, and provided with 13 U-shaped heat removal water pipes inside, with the external diameter of the straight pipe section of each heat removal water pipe being 30 mm, and the length of the straight pipe section being 10 m; and 2 sets of cyclone separators inside each comprising two stages of cyclone separators connected in series, with the external diameters of the first-stage and second-stage diplegs being respectively 50 mm and 50 mm, the length of the first-stage dipleg being 15.5 meters, and the length of the second-stage dipleg being 14.7 meters.

The reaction cooling section of the fluidized bed reactor had a diameter of 1.5 m, and a length L of 8.5 m. At the central point of the reaction cooling section, L1/S1=1.74 $m^{-1}$, L2/S1=1.39 $m^{-1}$, and L3/S1=0.36 $m^{-1}$.

The operating conditions of the apparatus were as follows: an air feed rate of 3200 $NM^3/h$, a temperature of room temperature, and a pressure of normal pressure.

The pressure pulsation intensity data was measured at $H_0$ of 2 meters, and shown in FIG. 6.

Comparative Example 2

As shown in FIG. 1, the fluidized bed reactor had a diameter of 1.5 m, a tangential height of 16 m (i.e., the total height of a dense phase zone and a dilute phase zone shown in the figure), was filled with 3.8 tons of acrylonitrile catalyst of SANC series available from Shanghai Research Institute of Petrochemical Technology SINOPEC, and provided with 39 U-shaped heat removal water pipes inside, with the external diameter of the straight pipe section of each heat removal water pipe being 30 mm, and the length of the straight pipe section being 10 m; and 2 sets of cyclone separators inside each comprising two stages of cyclone separators connected in series, with the external diameters of the first-stage and second-stage diplegs being respectively 50 mm and 50 mm, the length of the first-stage dipleg being 15.5 meters, and the length of the second-stage dipleg being 14.7 meters.

The reaction cooling section of the fluidized bed reactor had a diameter of 1.5 m, and a length L of 8.5 m. At the central point of the reaction cooling section, L1/S1=4.52 $m^{-1}$, L2/S1=4.16 $m^{-1}$, and L3/S1=0.36 $m^{-1}$.

The operating conditions of the apparatus were as follows: an air feed rate of 3200 $NM^3/h$, a temperature of room temperature, and a pressure of normal pressure.

The pressure pulsation intensity data was measured at $H_0$ of 2 meters, and shown in FIG. 7.

During the operation of the apparatus, it was found that the concentration of fine particle catalysts in the gas phase at the outlet of the apparatus was increased, indicating a relatively serious abrasion of the catalyst.

Example 1

As shown in FIG. 1, the fluidized bed reactor had a diameter of 1.5 m, a tangential height of 16 m (i.e., the total height of a dense phase zone and a dilute phase zone shown in the figure), was filled with 3.8 tons of acrylonitrile catalyst of SANC series available from Shanghai Research Institute of Petrochemical Technology SINOPEC, and provided with 30 U-shaped heat removal water pipes inside, with the external diameter of the straight pipe section of each heat removal water pipe being 30 mm, and the length of the straight pipe section being 10 m; and 2 sets of cyclone separators inside each comprising two stages of cyclone separators connected in series, with the external diameters of the first-stage and second-stage diplegs being respectively 50 mm and 50 mm, the length of the first-stage dipleg being 15.5 meters, and the length of the second-stage dipleg being 14.7 meters.

The reaction cooling section of the fluidized bed reactor had a diameter of 1.5 m, and a length L of 8.5 m. At the central point of the reaction cooling section, $L1/S1=3.56$ m$^{-1}$, $L2/S1=3.20$ m$^{-1}$, and $L3/S1=0.36$ m$^{-1}$.

The operating conditions of the apparatus were as follows: an air feed rate of 3200 NM$^3$/h, a temperature of room temperature, and a pressure of normal pressure.

The pressure pulsation intensity data was measured at $H_0$ of 2 meters, and shown in FIG. 8.

Example 2

As shown in FIG. 1, the fluidized bed reactor had a diameter of 1.5 m, a tangential height of 16 m (i.e., the total height of a dense phase zone and a dilute phase zone shown in the figure), was filled with 3.8 tons of acrylonitrile catalyst of SANC series available from Shanghai Research Institute of Petrochemical Technology SINOPEC, and provided with 18 U-shaped heat removal water pipes, with the external diameter of the straight pipe section of each heat removal water pipe being 30 mm, and the length of the straight pipe section being 10 m; and 2 sets of cyclone separators inside each comprising two stages of cyclone separators connected in series, with the external diameters of the first-stage and second-stage diplegs being respectively 50 mm and 50 mm, the length of the first-stage dipleg being 15.5 meters, and the length of the second-stage dipleg being 14.7 meters. The reaction cooling section of the fluidized bed reactor had a diameter of 1.5 m, and a length L of 8.5 m. At the central point of the reaction cooling section, $L1/S1=2.28$ m$^{-1}$, $L2/S1=1.92$ m$^{-1}$, and $L3/S1=0.36$ m$^{-1}$.

The operating conditions of the apparatus were as follows: an air feed rate of 3200 NM$^3$/h, a temperature of room temperature, and a pressure of normal pressure.

The pressure pulsation intensity data was measured at $H_0$ of 2 meters, and shown in FIG. 9.

Example 3

As shown in FIG. 1, the fluidized bed reactor had a diameter of 1.5 m, a tangential height of 16 m (i.e., the total height of a dense phase zone and a dilute phase zone shown in the figure), was filled with 3.8 tons of acrylonitrile catalyst of SANC series available from Shanghai Research Institute of Petrochemical Technology SINOPEC, and provided with 36 U-shaped heat removal water pipes, with the external diameter of the straight pipe section of each heat removal water pipe being 30 mm, and the length of the straight pipe section being 10 m; and 2 sets of cyclone separators inside each comprising two stages of cyclone separators connected in series, with the external diameters of the first-stage and second-stage diplegs being respectively 50 mm and 50 mm, the length of the first-stage dipleg being 15.5 meters, and the length of the second-stage dipleg being 14.7 meters.

The reaction cooling section of the fluidized bed reactor had a diameter of 1.5 m, and a length L of 8.5 m. At the central point of the reaction cooling section, $L1/S1=4.20$ m$^{-1}$, $L2/S1=3.84$ m$^{-1}$, and $L3/S1=0.36$ m$^{-1}$.

The operating conditions of the apparatus were as follows: an air feed rate of 3200 NM$^3$/h, a temperature of room temperature, and a pressure of normal pressure.

The pressure pulsation intensity data was measured at $H_0$ of 2 meters, and shown in FIG. 10.

During the operation of the apparatus, the concentration of fine particle catalysts in the gas phase at the outlet of the apparatus was within an acceptable range.

Comparative Example 3

As shown in FIG. 1, the fluidized bed reactor had a diameter of 8 m, a tangential height of 18 m (i.e., the total height of a dense phase zone and a dilute phase zone shown in the figure), filled with 160 tons of acrylonitrile catalyst of SANC series, available from Shanghai Research Institute of Petrochemical Technology SINOPEC, and provided with 100 U-shaped heat removal water pipes inside, which were divided into 18 groups, with each group being formed by connecting two U, five U and six U in series, with the external diameter of the straight pipe section of each heat removal water pipe being 114 mm, and the length of the straight pipe section was 8 m; and provided with 18 cyclone separators inside that were divided into 9 sets each comprising two stages of cyclone separators connected in series, with the external diameters of the first-stage and second-stage diplegs being 326 mm and 219 mm respectively, the length of the first-stage dipleg being 12.0 meters, and the length of the second-stage dipleg being 10.1 meters.

The ratio of the number of cooling water pipes to the number of cyclone diplegs of the fluidized bed reactor was 11.11.

The reaction cooling section of the fluidized bed reactor had a diameter of 8 m, and a length L of 6.9 m. At the central point of the reaction cooling section, $L1/S1=1.73$ m$^{-1}$, $L2/S1=1.43$ m$^{-1}$, and $L3/S1=0.31$ m$^{-1}$.

The pressure pulsation intensity data was measured at $H_0$ of 2 meters and the pressure pulsation intensity data graph was similar to that of Comparative Example 1.

The operating conditions of the apparatus were as follows: a propylene feed rate of 5900 NM$^3$/h, a reaction temperature of 430° C., a reaction pressure of 0.055 MPa, and a propylene:ammonia:air ratio of 1:1.2:9.6.

The results from the operation of the apparatus were as follows: an AN yield of 78.3% and a propylene conversion of 95.4%.

Example 4

Figure 4:
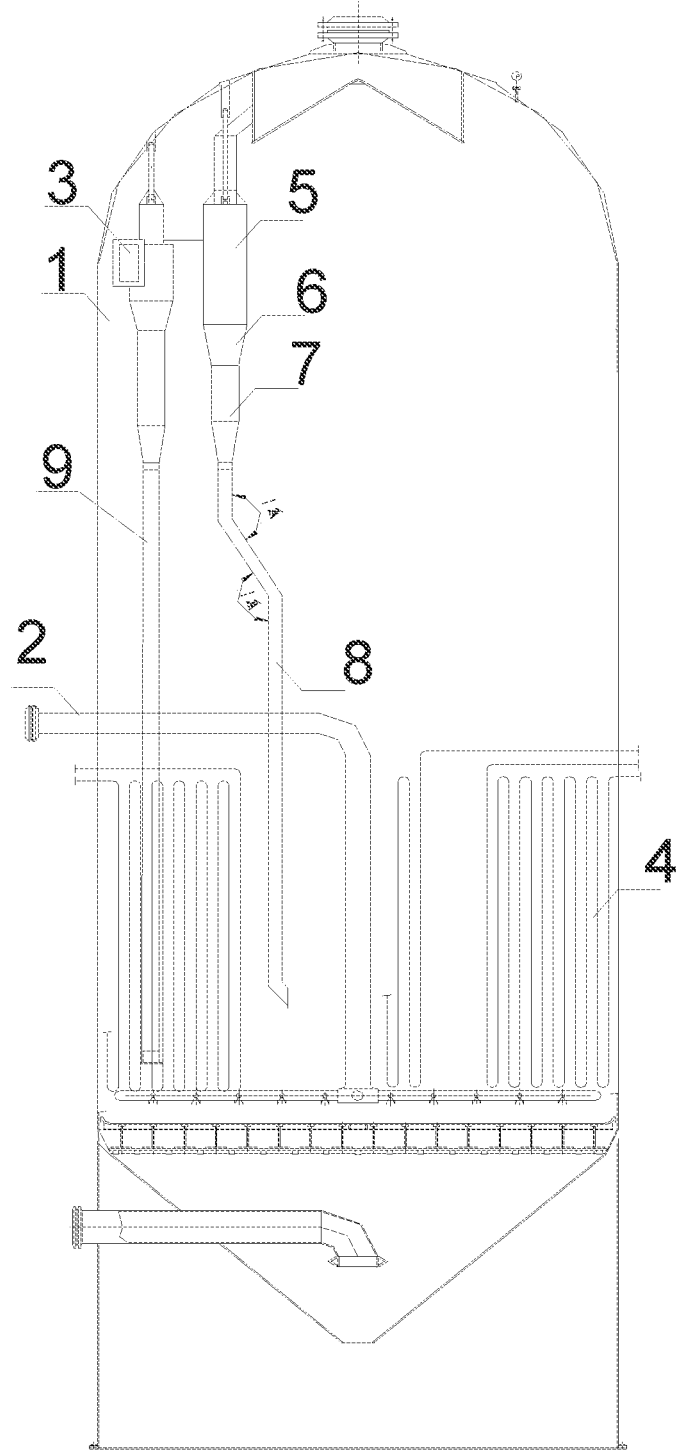
FIG. 4 is a schematic front view of a fluidized bed reactor of the present invention.

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 225 U-shaped heat removal water pipes inside, which were divided into 40 groups, with each group being formed by connecting two U, five U and six U in series, with the external diameter of the straight pipe section of each heat removal water pipe being 114 mm, the length of the straight pipe section being 10 m, and the pipe spacing being 220 mm; and 20 cyclone separators inside that were divided into 11 sets each comprising two stages of cyclone separators connected in series, with the external diameters of the first-stage and second-stage diplegs being 326 mm and 219 mm respectively, the length of the first-stage dipleg being 12.0 meters, and the length of the second-stage dipleg being 10.1 meters.

The ratio of the number of cooling water pipes to the number of cyclone diplegs of the fluidized bed reactor was 20.45.

The reaction cooling section of the fluidized bed reactor had a diameter of 8 m, and a length L of 7.4 m. At the central point of the reaction cooling section, $L1/S1=3.58$ m$^{-1}$, $L2/S1=3.21$ m$^{-1}$, and $L3/S1=0.37$ m$^{-1}$.

The pressure pulsation intensity data was measured at $H_0$ of 2 meters, and the pressure pulsation intensity data graph was similar to that of Example 1.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 80.5% and a propylene conversion of 98.5%.

Example 5

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 110 U-shaped heat removal water pipes inside, which were divided into 20 groups, with each group being formed by connecting two U, five U and six U in series, with the external diameter of the straight pipe section of each heat removal water pipe being 114 mm, the length of the straight pipe section being 10 m, and the pipe spacing being 220 mm; and 28 cyclone separators inside that were divided into 14 sets each comprising two stages of cyclone separators connected in series, with the external diameters of the first-stage and second-stage diplegs being 326 mm and 219 mm respectively, the length of the first-stage dipleg being 12.0 meters, and the length of the second-stage dipleg being 10.1 meters.

The ratio of the number of cooling water pipes to the number of cyclone diplegs of the fluidized bed reactor was 7.85.

The reaction cooling section of the fluidized bed reactor had a diameter of 8 m, and a length L of 7.4 m. At the central point of the reaction cooling section, $L1/S1=2.04$ $m^{-1}$, $L2/S1=1.57$ $m^{-1}$, and $L3/S1=0.48$ $m^{-1}$.

The pressure pulsation intensity data was measured at $H_0$ of 2 meters, and the pressure pulsation intensity data graph was similar to that of Example 2.

The operating conditions of the apparatus were as follows: a propylene feed rate of 5900 $NM^3/h$, a reaction temperature of 430° C., a reaction pressure of 0.04 MPa, and a propylene:ammonia:air ratio of 1:1.2:9.6.

The results from the operation of the apparatus were as follows: an AN yield of 79.3% and a propylene conversion of 96.8%.

Example 6

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 266 U-shaped heat removal water pipes inside, which were divided into 48 groups, with each group being formed by connecting two U, five U and six U in series, with the external diameter of the straight pipe section of each heat removal water pipe being 114 mm, the length of the straight pipe section being 10 m, and the pipe spacing being 215 mm; and 18 cyclone separators inside that were divided into 9 sets each comprising two stages of cyclone separators connected in series, with the external diameters of the first-stage and second-stage diplegs being 326 mm and 219 mm respectively, the length of the first-stage dipleg being 12.0 meters, and the length of the second-stage dipleg being 10.1 meters.

The ratio of the number of cooling water pipes to the number of cyclone diplegs of the fluidized bed reactor was 29.55.

The reaction cooling section of the fluidized bed reactor had a diameter of 8 m, and a length L of 7.4 m. At the central point of the reaction cooling section, $L1/S1=4.10$ $m^{-1}$, $L2/S1=3.79$ $m^{-1}$, and $L3/S1=0.31$ $m^{-1}$.

The pressure pulsation intensity data was measured at $H_0$ of 2 meters, and the pressure pulsation intensity data graph was similar to that of Example 3.

The operating conditions of the apparatus were as follows: a propylene feed rate of 5900 $NM^3/h$, a reaction temperature of 430° C., a reaction pressure of 0.04 MPa, and a propylene:ammonia:air ratio of 1:1.2:9.6.

The results from the operation of the apparatus were as follows: an AN yield of 80.5% and a propylene conversion of 98.6%.

Example 7

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 225 U-shaped heat removal water pipes inside, which were divided into 40 groups, with each group being formed by connecting two U, five U and six U in series, with the external diameter of the straight pipe section of each heat removal water pipe being 114 mm, the length of the straight pipe section being 10 m, and the pipe spacing being 220 mm; and 12 cyclone separators inside that were divided into 4 sets each comprising three stages of cyclone separators connected in series, with the external diameters of the first-stage, second-stage and third-stage diplegs being 326 mm, 219 mm and 219 mm respectively, the length of the first-stage dipleg being 12.0 meters, and the length of the second-stage and third-stage diplegs being 10.1 meters.

The reaction cooling section of the fluidized bed reactor had a diameter of 8 m, and a length L of 7.4 m. At the central point of the reaction cooling section, $L1/S1=3.40$ $m^{-1}$, $L2/S1=3.21$ $m^{-1}$, and $L3/S1=0.19$ $m^{-1}$.

The pressure pulsation intensity data was measured at $H_0$ of 2 meters, and the pressure pulsation intensity data graph was similar to that of Example 1.

The operating conditions of the apparatus were as follows: a propylene feed rate of 5900 $NM^3/h$, a reaction temperature of 430° C., a reaction pressure of 0.04 MPa, and a propylene:ammonia:air ratio of 1:1.2:9.6.

The results from the operation of the apparatus were as follows: an AN yield of 79.5% and a propylene conversion of 97.6%.

Example 8

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 225 U-shaped heat removal water pipes inside, which were divided into 40 groups, with each group being formed by connecting two U, five U and six U in series, with the external diameter of the straight pipe section of each heat removal water pipe being 114 mm, the length of the straight pipe section being 10 m, and the pipe spacing being 220 mm; and 24 cyclone separators inside that were divided into 8 sets each comprising three stages of cyclone separators connected in series, with the external diameters of the first-stage, second-stage and third-stage diplegs being 326 mm, 219 mm and 219 mm respectively, the length of the first-stage dipleg being 12.0 meters, and the length of the second-stage and third-stage diplegs being 10.1 meters.

The reaction cooling section of the fluidized bed reactor had a diameter of 8 m, and a length L of 7.4 m. At the central point of the reaction cooling section, $L1/S1=3.23$ m$^{-1}$, $L2/S1=2.85$ m$^{-1}$, and $L3/S1=0.38$ m$^{-1}$.

The pressure pulsation intensity data was measured at $H_0$ of 2 meters, and the pressure pulsation intensity data graph was similar to that of Example 1.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 80.2% and a propylene conversion of 98.1%.

Example 9

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 140 U-shaped heat removal water pipes, which were divided into 26 groups, with each group being formed by connecting two U, five U and six U in series, with the external diameter of the straight pipe section of each heat removal water pipe being 114 mm, and the length of the straight pipe section being 8 m; and 18 cyclone separators inside that were divided into 9 sets each comprising two stages of cyclone separators connected in series, with the external diameters of the first-stage and second-stage diplegs being 326 mm and 219 mm respectively, the length of the first-stage dipleg being 12.0 meters, and the length of the second-stage dipleg being 10.1 meters.

The reaction cooling section of the fluidized bed reactor had a diameter of 8 m, and a length L of 7.2 m. At the central point of the reaction cooling section, $L1/S1=2.28$ m$^{-1}$, $L2/S1=2.00$ m$^{-1}$, and $L3/S1=0.29$ m$^{-1}$.

The pressure pulsation intensity data was measured at $H_0$ of 2 meters and the pressure pulsation intensity data graph was similar to that of Example 2.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 79.6% and a propylene conversion of 97.3%.

Example 10

Figure 5:
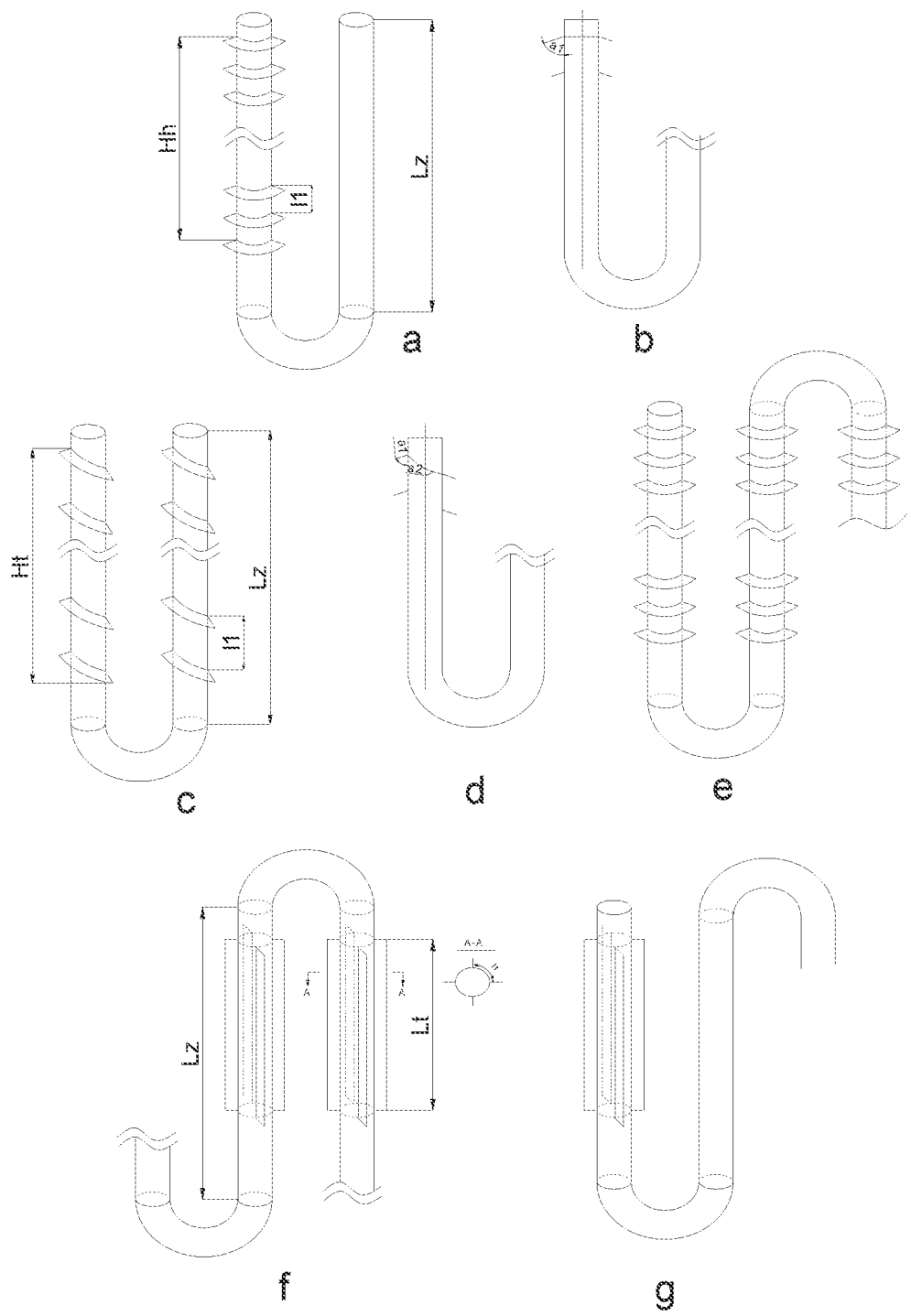
FIG. 5 is a schematic view of an exemplary embodiment of a heat removal water pipe of the present invention.

As shown in FIG. 4, the fluidized bed reactor had a diameter of 8 meters and a tangential height of 18 meters (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 190 U-shaped heat removal water pipes inside, which were divided into 34 groups, with each group being formed by connecting two U, five U and six U in series, with the external diameter of the straight pipe section of each heat removal water pipe being 114 mm, the length (Lz) of the straight pipe section being 8 m, and fins being provided outside the pipe walls of 95 straight pipe sections, as shown in FIG. 5f, in which 4 fins were uniformly distributed on the outer pipe wall, and the fins had a length (Lt) of 3000 mm, a height of 10 mm and a width of 20 mm. The fluidized bed reactor was further provided with 22 cyclone separators inside that were divided into 11 sets each comprising two stages of cyclone separators connected in series, with the external diameters of the first-stage and second-stage diplegs being 326 mm and 219 mm respectively, the length of the first-stage dipleg being 12.0 m, and the length of the second dipleg being 10.1 m.

The reaction cooling section of the fluidized bed reactor had a diameter of 8 m, and a length L of 7.4 m. At the central point of the reaction cooling section, $L1/S1=3.12$ m$^{-1}$, $L2/S1=2.75$ m$^{-1}$, and $L3/S1=0.37$ m$^{-1}$.

The pressure pulsation intensity data was measured at $H_0$ of 2 meters and the pressure pulsation intensity data graph was similar to that of Example 1.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 80.7% and a propylene conversion of 98.8%.

Example 11

As shown in FIG. 4, the fluidized bed reactor had a diameter of 8 m and a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 190 U-shaped heat removal water pipes inside, which were divided into 34 groups, with each group being formed by connecting two U, five U and six U in series, with the external diameter of the straight pipe section of each heat removal water pipe being 114 mm, the length (Lz) of the straight pipe section being 8 m, and fins being provided outside the pipe walls of 95 straight pipe sections, as shown in FIG. 5a, in which 8 fins were distributed on the outer pipe wall, with the vertical spacing between the fins being 500 mm and the angle α1 being 50°. The fins had a length (Lt) of 3500 mm, a height of 10 mm and a width of 20 mm. The fluidized bed reactor was further provided with 20 cyclone separators inside that were divided into 10 sets each comprising two stages of cyclone separators connected in series, with the external diameters of the first-stage and second-stage diplegs being 326 mm and 219 mm respectively, the length of the first-stage dipleg being 12.0 m, and the length of the second dipleg being 10.1 m.

The reaction cooling section of the fluidized bed reactor had a diameter of 8 m, and a length L of 7.4 m. At the central point of the reaction cooling section, $L1/S1=3.15$ m$^{-1}$, $L2/S1=2.78$ m$^{-1}$, and $L3/S1=0.37$ m$^{-1}$.

The pressure pulsation intensity data was measured at $H_0$ of 2 meters and the pressure pulsation intensity data graph was similar to that of Example 1.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 80.6% and a propylene conversion of 98.7%.

Example 12

As shown in FIG. 4, the fluidized bed reactor had a diameter of 8 m, a tangential height of 18 m (i.e., the total height of a dense phase zone and a dilute phase zone shown in the figure), filled with 160 tons of acrylonitrile catalyst of SANC series available from Shanghai Research Institute of Petrochemical Technology SINOPEC, and provided with 225 U-shaped heat removal water pipes inside, which were divided into 40 groups, with each group being formed by connecting two U, five U and six U in series, with the external diameter of the straight pipe section of each heat removal water pipe being 114 mm, and the length of the straight pipe section being 8 m; and 42 cyclone separators inside that were divided into 21 sets each comprising two stages of cyclone separators connected in series, with the external diameters of the first-stage and second-stage diplegs being respectively 400 mm and 325 mm, the length of the first-stage dipleg being 12.0 meters, and the length of the second-stage dipleg being 10.1 meters.

The reaction cooling section of the fluidized bed reactor had a diameter of 8 m, and a length L of 7.2 m. At the central point of the reaction cooling section, $L1/S1=4.16$ m$^{-1}$, $L2/S1=3.21$ m$^{-1}$, and $L3/S1=0.95$ m$^{-1}$.

The pressure pulsation intensity data was measured at $H_0$ of 2 meters and the pressure pulsation intensity data graph was similar to that of Example 1.

The operating conditions of the apparatus were as follows: a propylene feed rate of 5900 NM$^3$/h, a reaction temperature of 430° C., a reaction pressure of 0.04 MPa, and a propylene:ammonia:air ratio of 1:1.2:9.6.

The results from the operation of the apparatus were as follows: an AN yield of 80.1% and a propylene conversion of 98.7%.

The invention claimed is:

1. A fluidized bed reactor, comprising at least a reaction cooling section and a vertical inner component provided in the reaction cooling section, wherein, when a length of the reaction cooling section in a direction along a central axis of the fluidized bed reactor is designated as L, expressed in a unit of m, and, at a cross section transverse and perpendicular to the central axis of the fluidized bed reactor at an arbitrary position within a region from 45% L above to 38% L below a central point of the reaction cooling section, an area of the cross section of the reaction cooling section is designated as S1, expressed in a unit of m$^2$, and an outer contour circumference of the cross section of the vertical inner component is designated as L1, expressed in a unit of m, and, $L1/S1=2.0$-$4.3$ m$^{-1}$, wherein, when there are a plurality of cross sections, the outer contour circumference of the cross section of the vertical inner component is a sum of the outer contour circumferences of all of the plurality of cross sections.

2. The fluidized bed reactor according to claim 1, wherein the vertical inner component is a heat removal water pipe or a combination of a heat removal water pipe and a gas-solid separator.

3. The fluidized bed reactor according to claim 1, wherein the vertical inner component is a heat removal water pipe, wherein, at a cross section transverse and perpendicular to the central axis of the fluidized bed reactor, an area of the cross section of the reaction cooling section is designated as S1, expressed in a unit of m$^2$, and an outer contour circumference of the cross section of the heat removal water pipe, calculated on the basis of the straight pipe section, is designated as L2, expressed in a unit of m, and, $L2/S1=1.7$-$3.6$ m$^{-1}$, and the vertical inner component optionally further comprises a gas-solid separator, where, at a cross section transverse and perpendicular to the central axis of the fluidized bed reactor, an area of the cross section of the reaction cooling section is designated as S1, expressed in a unit of m$^2$, and an outer contour circumference of the cross section of the gas-solid separator, calculated on the basis of the dipleg, is designated as L3, expressed in a unit of m, and, $L3/S1=0.25$-$0.85$ m$^{-1}$, wherein, when there are a plurality of cross sections, L2 or L3 refers to a sum of the outer contour circumferences of all of the plurality of cross sections.

4. The fluidized bed reactor according to claim 2, wherein the number of the heat removal water pipes, calculated on the basis of the straight pipe section, is 220-5000, and/or the number of the gas-solid separators, calculated on the basis of the dipleg, is 16-516, and/or, the ratio of the number of the straight pipe sections to the number of the diplegs is 8.5-24.0.

5. The fluidized bed reactor according to claim 4, wherein the external diameters of the straight pipe sections, being the same as or different from each other, are each independently 80 to 180 mm, and/or the inner diameters of the straight pipe sections, being the same as or different from each other, are each independently 60 to 150 mm, and/or the lengths of the straight pipe sections, being the same as or different from each other, are each independently 4.0 to 13 m, and/or the external diameters of the diplegs, being the same as or different from each other, are each independently 150 to 410 mm, and/or the inner diameters of the diplegs, being the same as or different from each other, are each independently 130 to 400 mm, and/or the lengths of the diplegs, being the same as or different from each other, are each independently 6 to 14 m, and/or, the reaction cooling section has a diameter of 5 to 29 m, an area S1 of 19.6 to 660 m$^2$, and/or a length L of 4-12.5 m.

6. The fluidized bed reactor according to claim 1, comprising a head, a dilute phase zone, the reaction cooling section, a pre-reaction section and a cone in sequence from top to bottom, and further comprising a gas distribution plate and optionally a fluid distributor provided in the pre-reaction section.

7. The fluidized bed reactor according to claim 1, wherein the reaction cooling section has a substantially circular cross section, and/or the cross section of the vertical inner component has a substantially circular inner contour and a substantially circular outer contour, and/or the cross section of the vertical inner component has a substantially circular inner contour and a substantially circular outer contour with protrusion(s), and/or the vertical inner component comprises a heat removal water pipe, the heat removal water pipe has a heat removal medium inlet, n straight pipe sections and a heat removal medium outlet, wherein a head end of the first straight pipe section is in communication with the heat removal medium inlet, a tail end of the n-th straight pipe section is in communication with the heat removal medium outlet, a tail end of the i-th straight pipe section is in communication with a head end of the (i+1)-th straight pipe section through a U-shaped pipe, wherein n is an integer from 2 to 100, i refers to an arbitrary integer between 1 and n−1, and protrusion(s) is present on the outer wall of a part or all of the straight pipe sections.

8. The fluidized bed reactor according to claim 7, wherein the centerlines of any two adjacent straight pipe sections are parallel to each other and distances between the centerlines of any two adjacent straight pipe sections are the same as or different from each other, and are each independently 160-540 mm.

9. The fluidized bed reactor according to claim 7, wherein the protrusion(s) extends continuously or discontinuously in a direction along a centerline of the straight pipe section, and/or the protrusion(s) extends continuously or discontinuously around the centerline of the straight pipe section.

10. The fluidized bed reactor according to claim 7, wherein where the protrusion(s) extends continuously or discontinuously in a direction along a centerline of the straight pipe section, the extension length Lt of the protrusion(s) is not greater than the length Lz of the straight pipe section, and/or, where the protrusion(s) extends continuously or discontinuously around the centerline of the straight pipe section in the form of a ring, the height Hh of the ring is not greater than the length Lz of the straight pipe section, or, where the protrusion(s) extends continuously or discontinuously around the centerline of the straight pipe section in the form of a spiral, the height Ht of the spiral is not greater than the length Lz of the straight pipe section, and/or the height of the protrusion(s) is 0.005 to 0.3 times the external diameter of the straight pipe section, and/or the width of the protrusion(s) is 0.005 to 0.3 times the external diameter of the straight pipe section.

11. The fluidized bed reactor according to claim 7, wherein the protrusion(s) extends continuously or discontinuously around a centerline of the straight pipe section, and there is an angle between the centerline of the protrusion(s) and the centerline of the straight pipe section that is greater than 0° and not greater than 90°.

12. A method for producing an unsaturated nitrile, comprising the step of subjecting an olefin to an ammoxidation reaction in a fluidized bed reactor according to claim 1 to produce an unsaturated nitrile.

13. The fluidized bed reactor according to claim 1, wherein L1/S1=2.2-4.1 m$^{-1}$.

14. The fluidized bed reactor according to claim 3, wherein L2/S1=1.9-3.5 m$^{-1}$, and/or, said gas-solid separator is a cyclone separator, and/or, L3/S1=0.30-0.75 m$^{-1}$.

15. The fluidized bed reactor according to claim 14, wherein L1/S1=2.4-3.9 m$^{-1}$, and/or, L2/S1=2.1-3.3 m$^{-1}$, and/or, L3/S1=0.35-0.65 m$^{-1}$.

16. The fluidized bed reactor according to claim 4, wherein the number of the heat removal water pipes, calculated on the basis of the straight pipe section, is 300-2400, and/or, the number of the gas-solid separators, calculated on the basis of the dipleg, is 16-210, and/or, the ratio of the number of the straight pipe sections to the number of the diplegs is 11.5-21.0.

17. The fluidized bed reactor according to claim 5, wherein the external diameters of the straight pipe sections are each independently 90 to 170 mm, and/or, the inner diameters of the straight pipe sections are each independently 70 to 140 mm, and/or, the lengths of the straight pipe sections are each independently 5.5 to 12.0 m, and/or, the external diameters of the diplegs are each independently 200 to 360 mm, and/or, the inner diameters of the diplegs are each independently 180 to 350 mm, and/or, the lengths of the diplegs are each independently 10 to 13 m, and/or, the reaction cooling section has a diameter of 7 to 20 m, and/or, an area S1 of 38.5 to 314 m$^2$, and/or, a length L of 5.5-11.5 m.

18. The fluidized bed reactor according to claim 7, wherein said straight pipe is a straight circular pipe, and/or, n is an integer from 2 to 20, and/or there is protrusion(s) on the outer wall of 10-40% of the straight pipe sections.

19. The fluidized bed reactor according to claim 8, wherein the distances between the centerlines of any two adjacent straight pipe sections are each independently 180-430 mm.

20. The fluidized bed reactor according to claim 9, wherein the protrusion(s) extends continuously or discontinuously around the centerline of the straight pipe section in the form of a ring or a spiral.

21. The fluidized bed reactor according to claim 10, wherein Lt/Lz is 0.1 to 0.6, and/or, Hh/Lz is 0.01 to 0.3, and/or, Ht/Lz is 0.2 to 0.6, and/or the height of the protrusion(s) is 0.008 to 0.1 times the external diameter of the straight pipe section, and/or the width of the protrusion(s) is 0.008 to 0.2 times the external diameter of the straight pipe section.

22. The fluidized bed reactor according to claim 11, wherein the angle between the centerline of the protrusion(s) and the centerline of the straight pipe section is not less than 10° and not greater than 60°.

* * * * *